（12） United States Patent
Darner (10) Patent No.: US 10,663,025 B2
(45) Date of Patent: May 26, 2020

(54) BUSHING ASSEMBLY FOR A SPRING BRAKE ACTUATOR OF A VEHICLE AIR BRAKING SYSTEM (71) Applicant: Bendix Spicer Foundation Brake LLC, Elyria, OH (US)

(72) Inventor: Brett S Darner, Wellington, OH (US)

(73) Assignee: Bendix Spicer Foundation Brake LLC, Elyria, OH (US)

( * ) Notice: Subject to any disclaimer, the term of this patent is extended or adjusted under 35 U.S.C. 154(b) by 38 days.

(21) Appl. No.: 16/050,489

(22) Filed: Jul. 31, 2018

(65) Prior Publication Data

US 2020/0040955 A1 Feb. 6, 2020

(51) Int. Cl.
| | |
|---|---|
| *F16D 65/22* | (2006.01) |
| *B60T 13/38* | (2006.01) |
| *B60T 17/08* | (2006.01) |
| *F16D 121/02* | (2012.01) |
| *F16D 125/12* | (2012.01) |
| *F16D 125/26* | (2012.01) |
| *F16D 125/30* | (2012.01) |
| *F16D 125/66* | (2012.01) |

(52) U.S. Cl.
CPC ............ *F16D 65/22* (2013.01); *B60T 13/38* (2013.01); *B60T 17/083* (2013.01); *B60T 17/085* (2013.01); *F16D 2121/02* (2013.01); *F16D 2125/12* (2013.01); *F16D 2125/26* (2013.01); *F16D 2125/30* (2013.01); *F16D 2125/66* (2013.01)

(58) Field of Classification Search
CPC .. F16D 65/22; F16D 2121/02; F16D 2125/12; F16D 2121/26; F16D 2121/30; F16D 2121/66; B60T 13/38; B60T 17/083; B60T 17/085; B60T 17/088
See application file for complete search history.

(56) References Cited

U.S. PATENT DOCUMENTS

| | | |
|---|---|---|
| 5,016,523 A | 5/1991 | Bowyer |
| 5,105,727 A | 4/1992 | Bowyer |
| 5,829,339 A | 11/1998 | Smith |

(Continued)

FOREIGN PATENT DOCUMENTS

| | | |
|---|---|---|
| CN | 201705943 U | 1/2011 |
| CN | 202431804 U | 9/2012 |

(Continued)

OTHER PUBLICATIONS

European Patent Office, "International Search Report and Written Opinion", report, dated Nov. 201, 2019, 9 pages, European Patent Office Rijswijk, Netherlands.

(Continued)

*Primary Examiner* — Xuan Lan Nguyen
(74) *Attorney, Agent, or Firm* — Cheryl Greenly; Brian Kondas; Eugene Clair (57) ABSTRACT

A bushing assembly is provided for a spring brake actuator of a vehicle air braking system. The bushing assembly comprises a single-piece bushing member made of a material that is homogenous throughout the bushing member. The bushing member includes a first rib structure that faces one axial direction of the bushing member and a second rib structure that faces an opposite axial direction of the bushing member.

16 Claims, 6 Drawing Sheets

(56) References Cited

U.S. PATENT DOCUMENTS

| | | | |
|---|---|---|---|
| 5,884,892 A * | 3/1999 | Gassen | F16F 1/387 248/635 |
| 6,062,124 A | 5/2000 | Zmyslowski | |
| 6,318,240 B1 | 11/2001 | Plantan | |
| 6,394,462 B1 | 5/2002 | Constantinides | |
| 6,588,314 B1 | 7/2003 | Stojic | |
| 6,626,083 B2 | 9/2003 | Bowyer | |
| 7,461,907 B2 | 12/2008 | Plantan | |
| 8,100,047 B2 | 1/2012 | Fisher | |
| 8,272,785 B2 * | 9/2012 | Hirose | B62D 3/12 384/215 |
| 8,453,556 B2 | 6/2013 | Plantan | |
| 8,789,664 B2 | 7/2014 | Fantazi | |
| 9,238,455 B2 | 1/2016 | Park | |
| 9,409,267 B2 | 8/2016 | Plantan | |
| 9,765,835 B2 | 9/2017 | Plantan | |
| 9,925,967 B2 | 3/2018 | Park | |
| 9,969,377 B2 | 5/2018 | Arkan | |
| 2007/0034465 A1 | 2/2007 | Thompson | |
| 2014/0197599 A1 | 7/2014 | Nahrwold | |
| 2016/0159377 A1 | 6/2016 | Wright | |
| 2018/0345944 A1 | 12/2018 | Kim | |

FOREIGN PATENT DOCUMENTS

| | | |
|---|---|---|
| DE | 10244916 A1 | 4/2004 |
| DE | 102009019569 A1 | 11/2019 |
| EP | 2711258 B1 | 12/2017 |
| JP | 2013230746 A | 11/2013 |
| KR | 101470152 B1 | 12/2014 |
| KR | 101778517 B1 | 9/2017 |
| WO | WO9421501 A1 | 9/1994 |
| WO | WO9628331 A1 | 9/1996 |
| WO | WO2012036646 A2 | 3/2012 |

OTHER PUBLICATIONS

Haldex, "Gold Seal by Haldex," advertisement, Sep. 2017, 4 pages, Haldex, USA.

* cited by examiner

BUSHING ASSEMBLY FOR A SPRING BRAKE ACTUATOR OF A VEHICLE AIR BRAKING SYSTEM

BACKGROUND

The present application relates to vehicle air braking systems, and is particularly directed to a bushing assembly for a spring brake actuator of a vehicle air braking system, such as for a spring brake actuator of a drum brake or a spring brake actuator of a disc brake of a vehicle air braking system.

A typical drum brake includes a brake shoe that engages a wheel drum to transmit braking torque through a brake spider to a wheel axle. One end of the brake shoe is pivotable against an anchor pin that is attached to one side of the brake spider. A cam follower roller is disposed at the other end of the brake shoe. When a service brake application occurs, a camshaft located on the side of the brake spider opposite the anchor pin is actuated to rotate about its longitudinal central axis. As the camshaft rotates about its longitudinal central axis, a cam surface of an S-cam mounted on the camshaft acts against the cam follower roller to pivot the brake shoe about the anchor pin. As the brake shoe pivots about the anchor pin, the brake lining of the brake shoe frictionally engages the wheel drum to transmit braking torque through the brake spider to the wheel axle and thereby to decelerate and brake the vehicle.

In a typical S-cam type of drum brake, a pneumatic system is linked by a pressurized air line to a spring brake actuator. The spring brake actuator is connected by a service push rod and clevis via a yoke to an arm of a slack adjuster. The slack adjuster is the link between the spring brake actuator and the camshaft. The slack adjuster includes a spline that is installed on a spline of the camshaft. The slack adjuster converts a linear force of the service push rod from the spring brake actuator into a torsional force that acts on the camshaft to rotate the camshaft about its longitudinal central axis. The entire slack adjuster operates as a unit, rotating as a lever with the camshaft as the brakes are applied or released.

More specifically, the service push rod from the spring brake actuator is disposed in a non-pressurized chamber of a service brake housing, and moves linearly (i.e., along the axial direction of the service push rod) in response to axial movement of an adapter push rod that is disposed in a pressurized chamber portion of a parking brake housing. When the pressure in the pressurized chamber portion of the parking brake housing drops, a compression spring in a non-pressurized chamber portion of the parking brake housing presses against a first diaphragm at one end of the adapter push rod and causes the other end of the adapter push rod to press against a second diaphragm. The second diaphragm in turn presses against one end of the service push rod to transfer the linear force from the adapter push rod through the second diaphragm to the opposite end of the service push rod that is fastened to the yoke of the slack adjuster.

A bushing assembly is usually disposed between the adapter push rod and an adapter base that is secured to the parking brake housing. The bushing assembly supports the adapter push rod for axial movement through an adapter plate that separates and lies between the parking brake housing and the service brake housing. The bushing assembly also provides a pressure seal between the pressurized chamber portion of the parking brake housing and the non-pressurized chamber of the service brake housing.

A typical disc brake converts air pressure into braking force. More specifically, when a foot brake is applied, compressed air enters through a supply port into a chamber of a spring brake actuator to apply pressure to a diaphragm. The pressure pushes the diaphragm, moving a pressure plate and push rod against a cup in a lever. The lever pivots on an eccentric bearing and transfers motion to an actuating beam. The actuating beam moves against a return force of a spring to move two threaded tappet sleeves and tappets. This movement of the two threaded tappet sleeves and tappets forces an inner brake pad into contact with a brake rotor. Further movement of the actuating beam forces a caliper, sliding on two stationary guide pins, away from the brake rotor. This movement of the caliper pulls an outer brake pad into the brake rotor to clamp the brake rotor in a braked position between the inner and outer brake pads to apply a braking force to a vehicle wheel which is attached to the brake rotor.

A bushing assembly is usually disposed between the push rod and a housing portion of the spring brake actuator. The bushing assembly supports the push rod for axial movement through an opening of the housing portion against the cup in the lever when the diaphragm is pushed in response to the foot brake being applied. Accordingly, those skilled in the art continue with research and development efforts in bushing assemblies for both spring brake actuators of disc brakes and spring brake actuators of drum brakes of a vehicle air braking system.

SUMMARY

In accordance with one example embodiment, a bushing assembly is provided for a spring brake actuator of a vehicle air braking system. The bushing assembly comprises a single-piece bushing member made of a material that is homogenous throughout the bushing member. The bushing member includes a first rib structure that faces one axial direction of the bushing member and a second rib structure that faces an opposite axial direction of the bushing member.

In accordance with another example embodiment, a bushing assembly is provided for a spring brake actuator of a vehicle air braking system. The bushing assembly comprises a bushing member including a plurality of pairs of adjacent concave-shaped stiffening ribs that are circumferentially offset from each other about a longitudinal central axis of the bushing member.

In accordance with yet another example embodiment, a bushing assembly is provided for a spring brake actuator of a vehicle air braking system. The bushing assembly comprises a non-metallic bushing member including a first plurality of stiffening ribs disposed on one end of the bushing member, and a second plurality of stiffening ribs disposed on an opposite end of the bushing member. The stiffening ribs of the first plurality of stiffening ribs are circumferentially spaced apart from each other on the one end of the bushing member. The stiffening ribs of the second plurality of stiffening ribs are circumferentially spaced apart from each other on the opposite end of the bushing member. Each pair of adjacent ribs of the first plurality of stiffening ribs has a circumferential distance therebetween that is substantially the same. Each pair of adjacent ribs of the second plurality of stiffening ribs has a circumferential distance therebetween that is substantially the same. The first plurality of stiffening ribs and the second plurality of stiffening ribs are circumferentially offset from each other about a longitudinal central axis of the bushing member. Each rib of the first and second plurality of stiffening ribs has a concave shape that curves inward toward center of the bushing member. The bushing member includes an inner circumferential surface having at least one groove into which an O-ring can be inserted. The bushing member includes an outer circumferential surface having at least one groove into which an O-ring can be inserted.

In accordance with still another example embodiment, a method is provided of operating a bushing assembly for a spring brake actuator of a vehicle air braking system. The method comprises linearly guiding a push rod of the spring brake actuator for axial movement of the push rod. The method also comprises restricting articulation of the push rod during linear axial movement of the push rod by using a rib structure arrangement of the bushing assembly.

DETAILED DESCRIPTION

Figure 1:
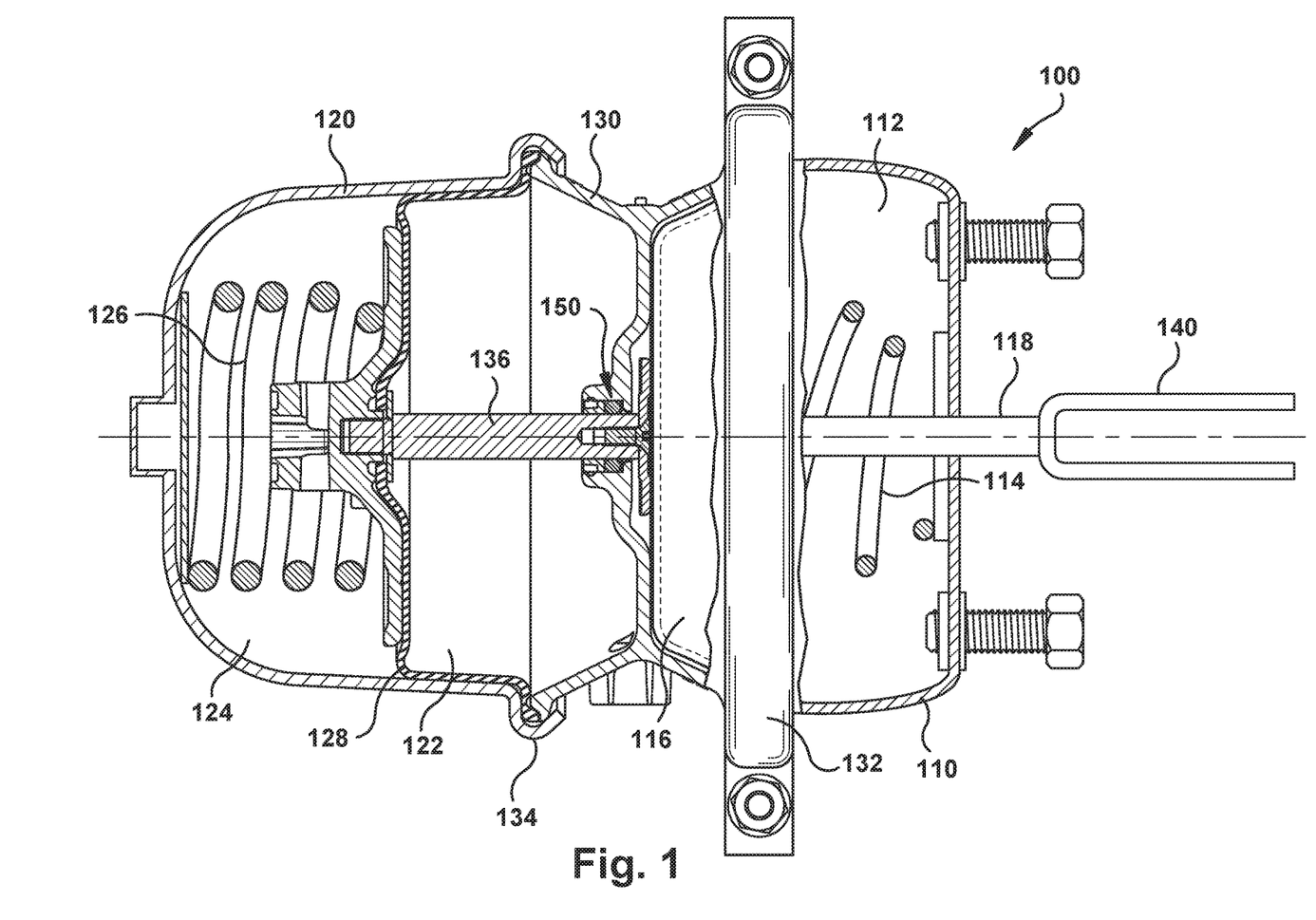
FIG. 1 is a cutaway view of a spring brake actuator embodying a bushing assembly constructed in accordance with an embodiment.

Referring to FIG. 1, a cutaway view of a spring brake actuator 100 embodying a bushing assembly 150 constructed in accordance with an embodiment is illustrated. The spring brake actuator 100 is for a drum brake of a vehicle air braking system. The spring brake actuator 100 includes a service brake housing 110 that has a non-pressurized chamber 112 in which a service return spring 114 is disposed. The spring brake actuator 100 also includes a parking brake housing 120 that has a pressurized chamber portion 122 and a non-pressurized portion 124 in which a power compression spring 126 is disposed.

The spring brake actuator 100 further includes an adapter base 130 that interconnects the service brake housing 110 and the parking brake housing 120. One end of the adapter base 130 is clamped using a clamp band 132 to the service brake housing 110. A service diaphragm 116 is disposed between the adapter base 130 and the service brake housing 110. An opposite end of the adapter base 130 may be crimped using a crimp band 134 to the parking brake housing 120. Alternatively, the parts may be crimpled together. A parking diaphragm 128 is disposed between the adapter base 130 and the parking brake housing 120.

One end of an adapter push rod 136 engages the parking diaphragm 128. The adapter push rod 136 is disposed in the pressurized chamber portion 122 of the parking brake housing 120. The opposite end of the adapter push rod 136 is guided by the bushing assembly 150 through a center opening in the adapter base 130, and an adapter plate 138 engages the service diaphragm 116. The service push rod 118 is disposed in the non-pressurized chamber 112 of the service brake housing 110. The opposite end of the service push rod 118 has a yoke 140 that is connectable to an arm of a slack adjuster (not shown) using a clevis (also not shown).

When the pressure in the pressurized chamber portion 122 of the parking brake housing 120 drops, the biasing force of the power compression spring 126 in the non-pressurized chamber portion 124 of the parking brake housing 120 presses against the parking diaphragm 128 to push the adapter push rod 136. This causes the adapter push rod 136 to press against the service diaphragm 116 which, in turn, pushes the service push rod 118. The linear force from the adapter push rod 136 is transferred through the service diaphragm 116 to the service push rod 118 and thereby to the yoke 140 which is connectable to the arm of the slack adjuster. The slack adjuster converts the linear force into a torsional force. Structure and operation of the slack adjuster in cooperation with the spring brake actuator 100 are conventional and, therefore, will not be described.

Figure 2:
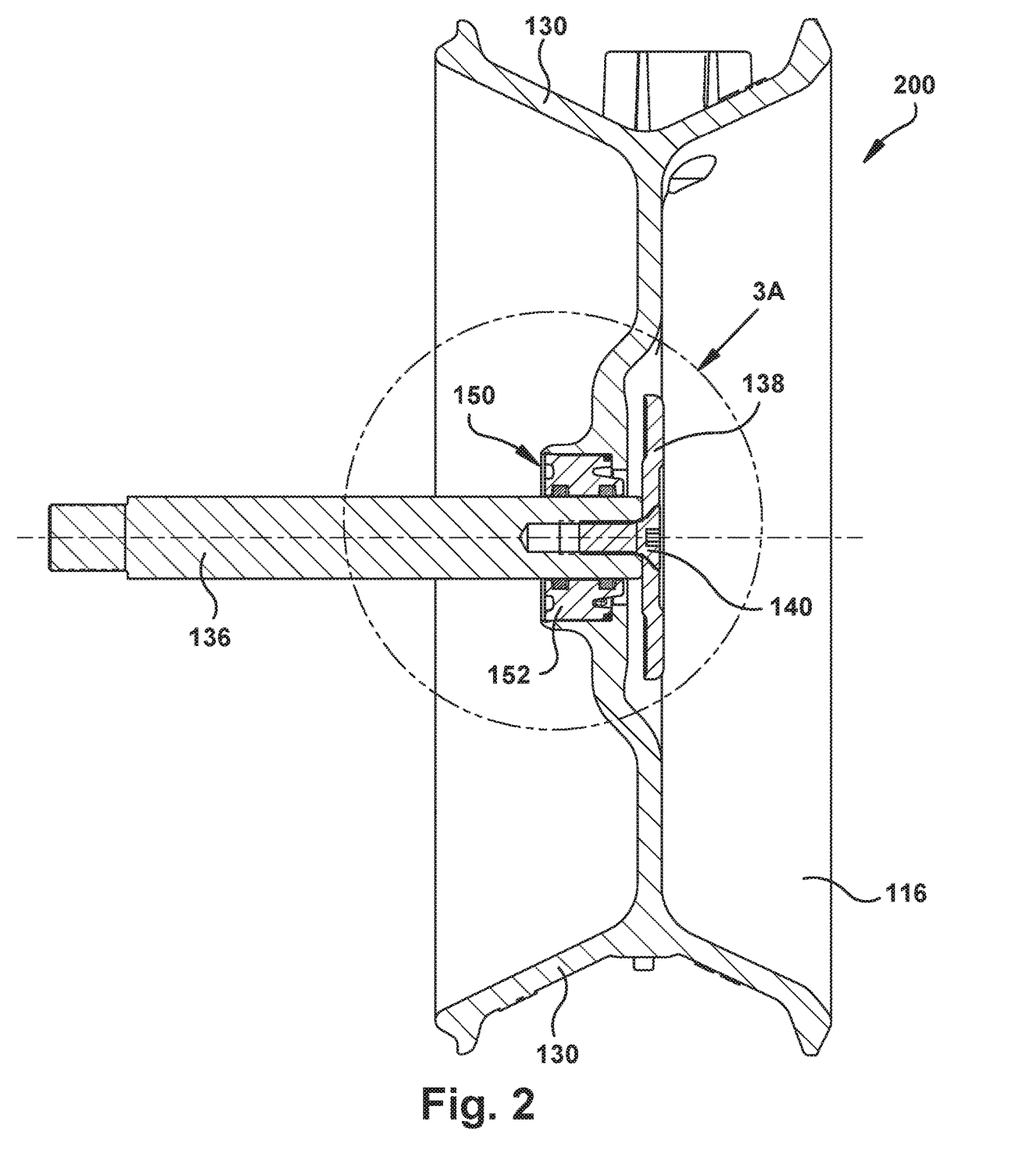
FIG. 2 is a sectional view of a subassembly including the bushing assembly of the spring brake actuator shown in FIG. 1.
Figure 3A:
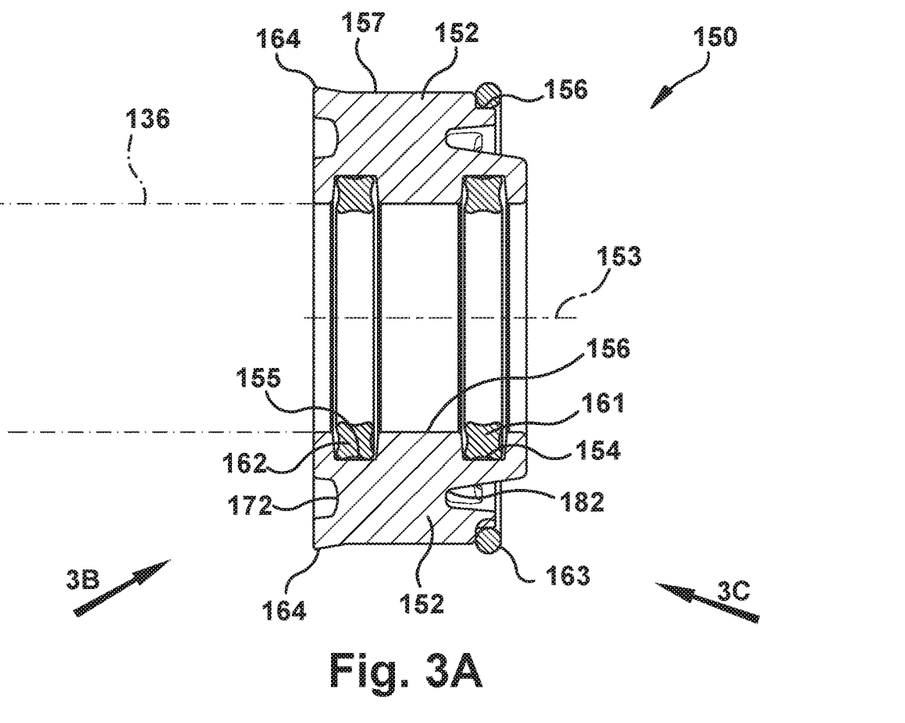
FIG. 3A is an enlarged view of the bushing assembly shown in FIG. 2.

Referring to FIG. 2, a sectional view of a subassembly 200 including the bushing assembly 150 of the spring brake actuator 100 shown in FIG. 1 is illustrated. FIG. 3A is an enlarged view of the bushing assembly 150 shown in FIG. 2. The bushing assembly 150 comprises a bushing member 152 that is disposed between the adapter base 130 and the adapter push rod 136. In some embodiments, the bushing member 152 includes a number of grooves for receiving a corresponding number of O-rings. For example, as shown in the embodiment of FIGS. 2 and 3A, the bushing member 152 has three grooves (i.e., a first groove 154, a second groove 155, and a third groove 156. The first groove 154 receives a first O-ring 161, the second groove 155 receives a second O-ring 162, and the third groove 156 receives a third O-ring 163. Thus, the bushing assembly 150 comprises at least the bushing member 152, and in some embodiments one or more O-rings.

The subassembly 200 of FIG. 2 comprises the bushing assembly 150 and a number of other components. In some embodiments of the subassembly 200, the other components include the adapter base 130, the service diaphragm 116, and the adapter push rod 136. The adapter base 130 has the adapter plate 138 to which one end of the adapter push rod 136 is secured using a screw 140. The adapter plate 138 presses against the service diaphragm 116. The other components of the subassembly 200 may comprise any combination of other components. As an example, the other components of the subassembly 200 may include the three O-rings 161, 162, 163 shown in FIGS. 2 and 3A. Accordingly, the three O-rings 161, 162, 163 can be part of the subassembly 200, or be part of the bushing assembly 150 as previously described hereinabove.

The bushing member 152 of the bushing assembly 150 is a single piece made of a material that is homogenous throughout the bushing member 152. The single-piece bushing member 152 has a longitudinal central axis 153, and comprises a non-metallic material. As an example, the non-metallic material of the single-piece bushing member 152 comprises plastic material. As another example, the non-metallic material of the single-piece bushing member 152 comprises rubber material. As yet another example, the non-metallic material of the single-piece bushing member 152 comprises nylon material. Other non-metallic materials are possible.

Figure 3B:
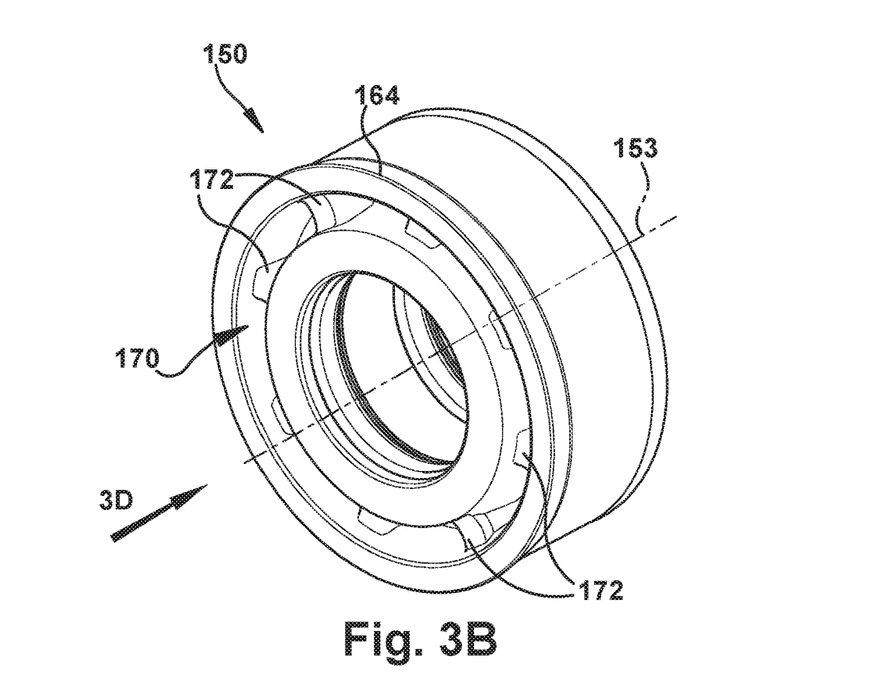
FIG. 3B is a perspective view, looking approximately in the direction of arrow "3B" shown in FIG. 3A, with certain components removed to more clearly show structural details of the bushing assembly.
Figure 3C:
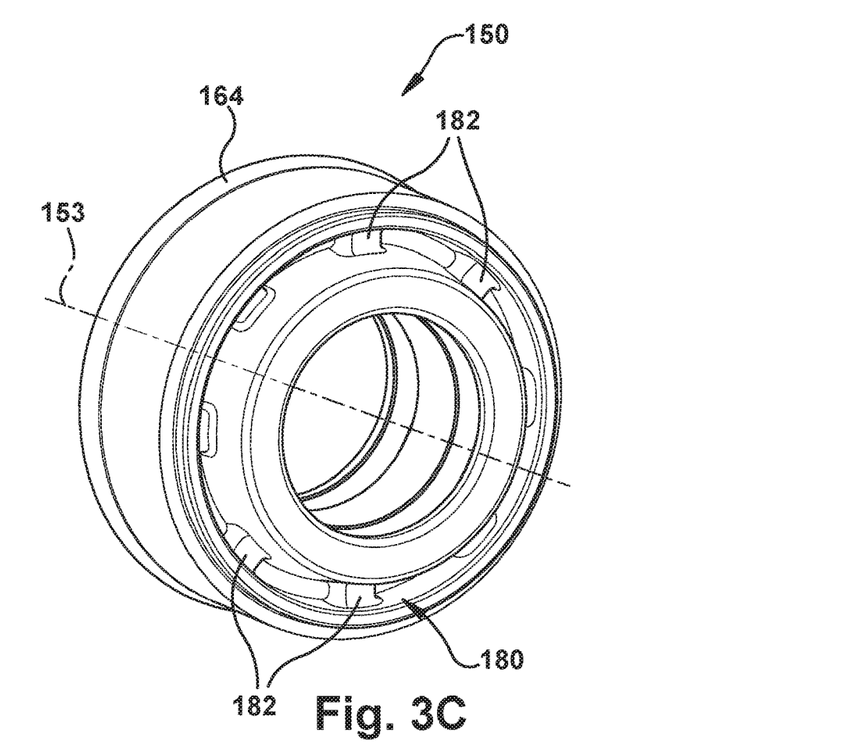
FIG. 3C is a perspective view, looking approximately in the direction of arrow "3C" shown in FIG. 3A, with certain components removed to more clearly show structural details of the bushing assembly.
Figure 3D:
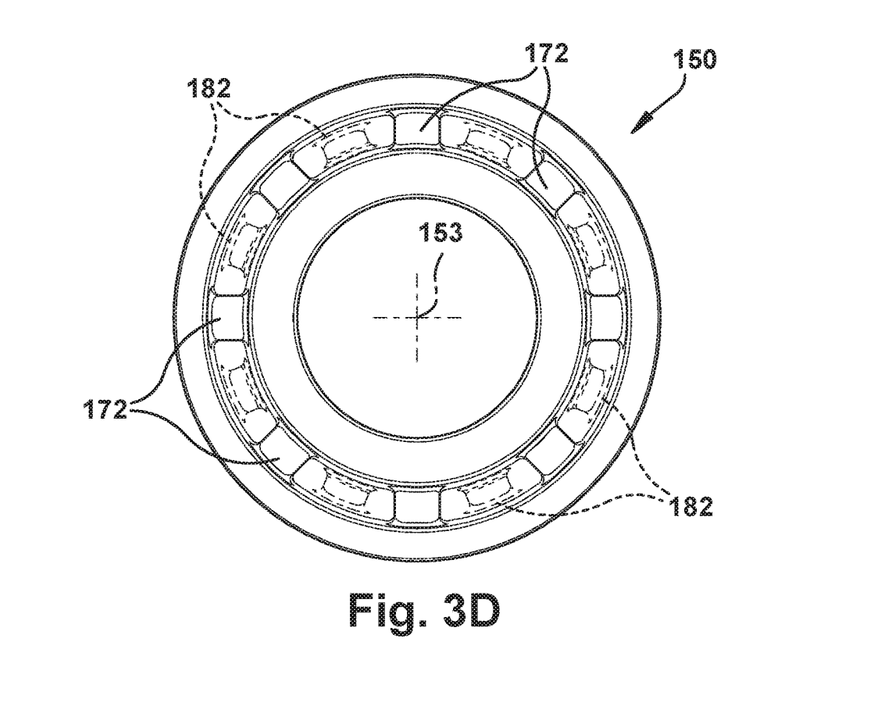
FIG. 3D is an end view, looking approximately in the direction of arrow "3D" shown in FIG. 3B, and showing spatial relationship of an arrangement of ribs of the bushing assembly.

Referring to FIG. 3B, a perspective view, looking approximately in the direction of arrow "3B" shown in FIG. 3A, is illustrated. FIG. 3B is shown with certain components (e.g., the O-rings 161, 162, 163) removed to more clearly show structural details of the bushing assembly 150. Similarly, FIG. 3C is a perspective view, looking approximately in the direction of arrow "3C. FIG. 3C is also shown with certain components removed to more clearly show structural details of the bushing assembly 150. FIG. 3D is an end view, looking approximately in the direction of arrow "3D" shown in FIG. 3B. FIG. 3D shows spatial relationship of an arrangement of ribs of the bushing assembly 150, as will be described in detail hereinbelow.

The arrangement of ribs of the bushing assembly 150 comprises a first rib structure 170 (FIG. 3B), and a second rib structure 180 (FIG. 3C). The first rib structure 170 faces one axial direction of the bushing member 152, and the second rib structure 180 faces an opposite axial direction of the bushing member 152. The first rib structure 170 includes a first plurality of stiffening ribs 172 disposed on one end of the bushing member 152. The stiffening ribs of the first plurality of stiffening ribs 172 are circumferentially spaced apart from each other on the one end of the bushing member 152. Similarly, the second rib structure 180 includes a second plurality of stiffening ribs 182 disposed on an opposite end of the bushing member 152. The stiffening ribs of the second plurality of stiffening ribs 182 are circumferentially spaced apart from each other on the opposite end of the bushing member 152.

More specifically, each pair of adjacent ribs of the first plurality of stiffening ribs 172 has a circumferential distance therebetween that is substantially the same (best shown in FIG. 3D). Each rib of the first plurality of stiffening ribs 172 has a concave shape (best shown in FIG. 3A) that curves inward toward center of the bushing member 152. Similarly, each pair of adjacent ribs of the second plurality of stiffening ribs 182 has a circumferential distance therebetween that is substantially the same (also best shown in FIG. 3D). Each rib of the second plurality of stiffening ribs 182 has a concave shape (also best shown in FIG. 3A) that curves inward toward center of the bushing member 152. The first plurality of stiffening ribs 172 and the second plurality of stiffening ribs 182 are circumferentially offset from each other about the longitudinal central axis 153 of the bushing member 152 (best shown in FIG. 3D).

The bushing member 152 includes an inner circumferential surface 156 (FIG. 3A) having the first groove 154 into which the first O-ring 161 is inserted, and the second groove 155 into which the second O-ring 162 is inserted. The bushing member 152 also includes an outer circumferential surface 157 having the third groove 156 into which the third O-ring 163 is inserted. The bushing member 152 further includes an outer circumferential edge 164 into which a surface of the adapter base 130 (FIG. 2) is staked.

It should be apparent that the outer circumferential edge 164 of the bushing member 152 is a fixed, rigid portion that supports and linearly guides the adapter push rod 136 for axial movement. At the same time, the ribs of the first and second plurality of stiffening ribs 172, 182 allows but also restricts articulation of the adapter push rod 136 during linear axial movement of the adapter push rod 136. Moreover, the double O-rings (i.e., the first O-ring 161 and the second O-ring 162) disposed in the first and second grooves 154, 155 on the inner circumferential surface 156 of the bushing member 152 provides a sealed joint that is a more robust seal between the pressurized chamber portion 122 of the parking brake housing 120 and the non-pressurized chamber 112 of the service brake housing 110.

It should also be apparent that the bushing member 152 of the bushing assembly 150 is made of a material that allows the sealed joint to be flexible. The flexibility of the sealed joint provides a more consistent seal between the pressurized chamber portion 122 of the parking brake housing 120 and the non-pressurized chamber 112 of the service brake housing 110.

Also, in the example embodiment shown in FIGS. 3A, 3B, 3C, and 3D, it should be apparent that the bushing member 152 includes a plurality of pairs of adjacent concave-shaped stiffening ribs (i.e., the first set of stiffening ribs 170 and the second set of stiffening ribs 180) that are circumferentially offset from each other about the longitudinal central axis 153 of the bushing member 152. At least one pair of the plurality of pairs of adjacent concave-shaped stiffening ribs is disposed on the one end of the bushing member 152. The at least one pair of the plurality of pairs of adjacent concave-shaped stiffening ribs that is disposed on the one end of the bushing member 152 includes at least four pairs of adjacent concave-shaped stiffening ribs.

Similarly, at least one pair of the plurality of pairs of adjacent concave-shaped stiffening ribs is disposed on an opposite end of the bushing member 152. The at least one pair of the plurality of pairs of adjacent concave-shaped stiffening ribs that is disposed on the opposite end of the bushing member 152 includes at least four pairs of adjacent concave-shaped stiffening ribs. Although four pairs of adjacent concave-shaped stiffening ribs are shown on each end of the bushing member 152, it is conceivable that any number of pairs of adjacent concave-shaped stiffening ribs be used.

It should further be apparent that the bushing member 152 in accordance with the above-described example embodiment is relatively easy to fabricate, and that the bushing assembly 150 is relatively easy to assemble. Moreover, the subassembly 200 comprising the bushing member 152 and other components is relatively easy to assemble.

Figure 4A:
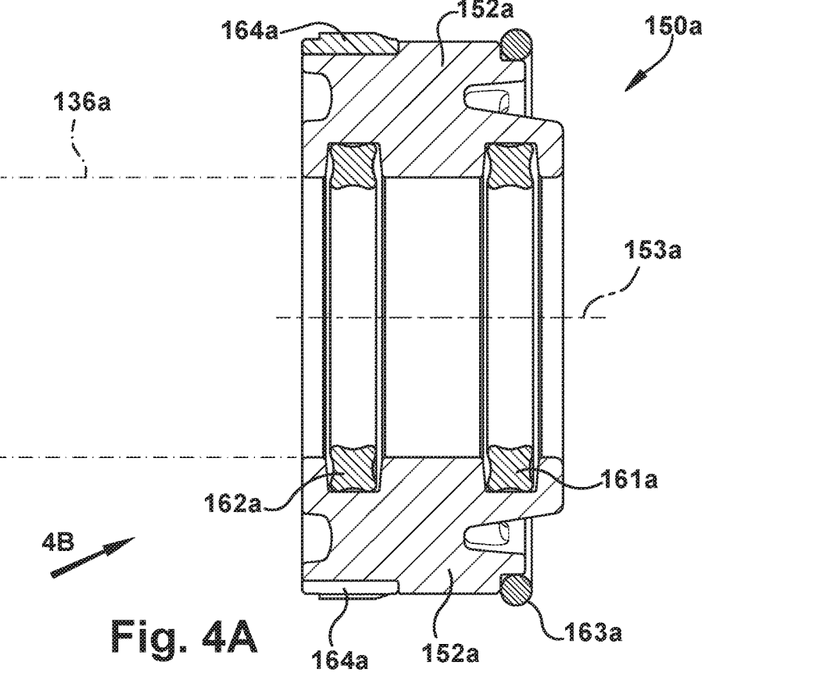
FIG. 4A is a perspective view similar to FIG. 3A, and showing an outer circumferential edge structure in accordance with another embodiment.
Figure 4B:
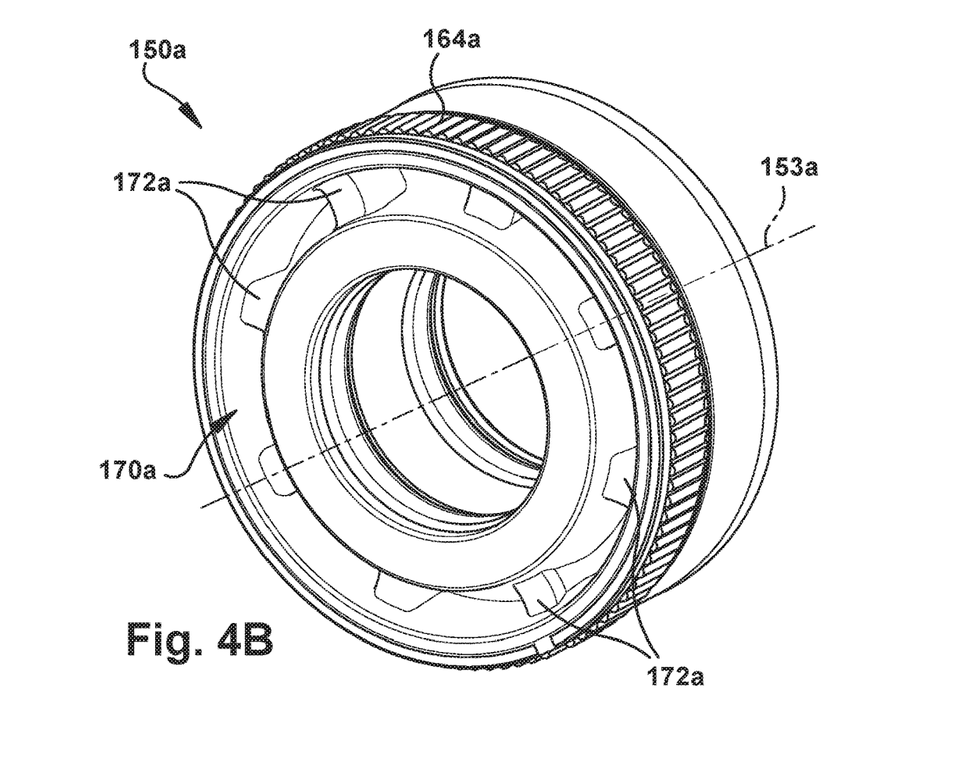
FIG. 4B is a perspective view looking approximately in the direction of arrow "4B" shown in FIG. 4A.

Although the above description describes a surface of the adapter base 130 being staked into the outer circumferential edge 164 of the bushing member 152 to secure the bushing member 152 to the adapter base 130, it is conceivable that the bushing member 152 may be secured to the adapter base 130 in a different manner, such as shown in FIGS. 4A and 4B.

Referring to FIG. 4A, an outer circumferential edge structure in accordance with another embodiment is illustrated. More specifically, FIG. 4A is a perspective view similar to FIG. 3A in which like components are illustrated with like reference numbers with a suffix "a" added to avoid confusion. FIG. 4B is a perspective view looking approximately in the direction of arrow "4B" shown in FIG. 4A. The bushing member 152*a* of the bushing assembly 150*a* includes an outer circumferential edge 164*a* that can be wedged against a surface of the adapter base (not shown in FIGS. 4A and 4B). The outer circumferential edge 164*a* has a plurality of substantially hemispherical-shaped projecting ribs that extend around a circumference of the bushing member 152*a*, as best shown in FIG. 4B. The outer circumferential edge 164a is a physically separate part that is assembled onto the outer diameter of the bushing member 152a.

Also, although the above description describes the bushing assembly 150, 150a and the subassembly 200 being used in a heavy vehicle such as a truck, it is conceivable that the bushing assembly 150, 150a and the subassembly 200 may be used in other types of commercial vehicles, such as busses for example.

Figure 5:
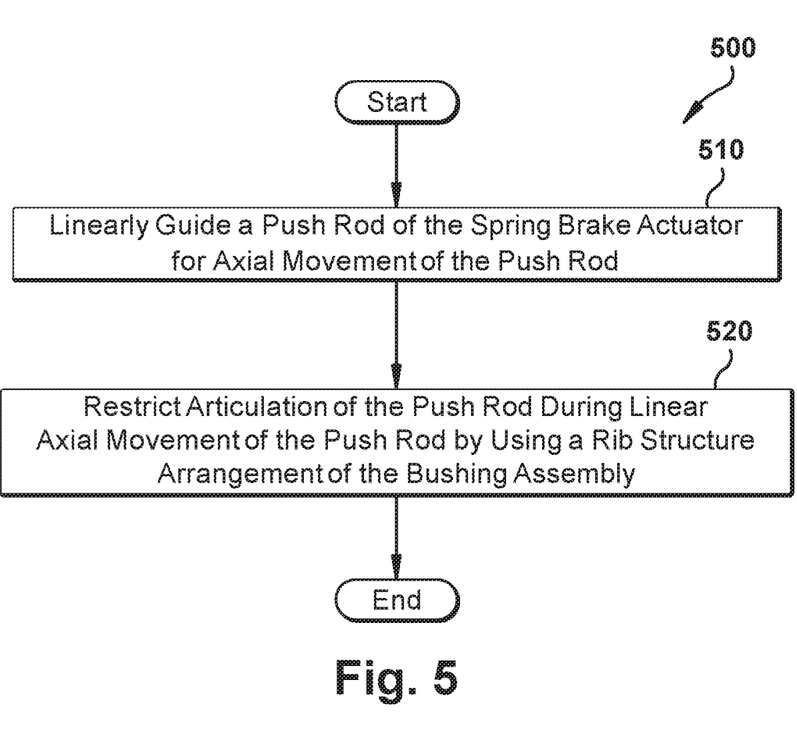
FIG. 5 is a flow diagram depicting a method of operating a bushing assembly of a spring brake actuator of a vehicle air braking system.

Referring to FIG. 5, a flow diagram 500 depicting a method of operating a bushing assembly of a spring brake actuator of a vehicle air braking system is illustrated. In block 510, a push rod of the spring brake actuator is linearly guided for axial movement of the push rod. Then in block 520, articulation of the push rod is restricted during linear axial movement of the push rod by using a rib structure arrangement of the bushing assembly.

In some embodiments, the restricting articulation of the push rod during linear axial movement of the push rod by using a rib structure arrangement of the bushing assembly includes facing a rib structure of the bushing assembly along an axial direction of the push rod and facing another rib structure of the bushing assembly along an opposite axial direction of the push rod so that the rib structures can cooperate together to restrict articulation of the push rod during linear axial movement of the push rod.

In some embodiments, the restricting articulation of the push rod during linear axial movement of the push rod by using a rib structure arrangement of the bushing assembly includes circumferentially offsetting a plurality of pairs of adjacent stiffening ribs of the bushing assembly so that the stiffening ribs can cooperate together to restrict articulation of the push rod during linear axial movement of the push rod.

While the present disclosure has been illustrated by the description of example processes and system components, and while the various processes and components have been described in detail, applicant does not intend to restrict or in any way limit the scope of the appended claims to such detail. Additional modifications will also readily appear to those skilled in the art. The disclosure in its broadest aspects is therefore not limited to the specific details, implementations, or illustrative examples shown and described. Accordingly, departures may be made from such details without departing from the spirit or scope of applicant's general concept.

What is claimed is:

1. A bushing assembly for a spring brake actuator of a vehicle air braking system, the bushing assembly comprising:
a single-piece bushing member made of a material that is homogenous throughout the bushing member, wherein the bushing member includes a first rib structure that faces one axial direction of the bushing member and a second rib structure that faces an opposite axial direction of the bushing member; wherein (i) the first rib structure includes a first plurality of stiffening ribs disposed on one end of the bushing member, and (ii) the second rib structure includes a second plurality of stiffening ribs disposed on an opposite end of the bushing member and each rib of the first and second plurality of stiffening ribs has a concave shape that curves inward toward center of the bushing member.

2. A bushing assembly according to claim 1, wherein (i) the stiffening ribs of the first plurality of stiffening ribs are circumferentially spaced apart from each other on the one end of the bushing member, and (ii) the stiffening ribs of the second plurality of stiffening ribs are circumferentially spaced apart from each other on the opposite end of the bushing member.

3. A bushing assembly according to claim 2, wherein (i) each pair of adjacent ribs of the first plurality of stiffening ribs has a circumferential distance therebetween that is substantially the same, and (ii) each pair of adjacent ribs of the second plurality of stiffening ribs has a circumferential distance therebetween that is substantially the same.

4. A bushing assembly according to claim 1, wherein the first plurality of stiffening ribs and the second plurality of stiffening ribs are circumferentially offset from each other about a longitudinal central axis of the bushing member.

5. A bushing assembly according to claim 1, wherein the single-piece bushing member comprises a non-metallic material selected from one of plastic material, rubber material, and nylon material.

6. A subassembly comprising the bushing assembly of claim 1, an adapter base having an adapter plate, a diaphragm in contact with the adapter plate, and an adapter push rod secured to the adapter plate, wherein the single-piece bushing member is disposed between the adapter base and the adapter push rod.

7. A subassembly according to claim 6, wherein a surface of the adapter base is staked into or wedged against an outer circumferential edge of the single-piece bushing member.

8. A bushing assembly for a spring brake actuator of a vehicle air braking system, the bushing assembly comprising:
a bushing member including a plurality of pairs of adjacent concave-shaped stiffening ribs that are circumferentially offset from each other about a longitudinal central axis of the bushing member.

9. A bushing assembly according to claim 8, wherein (i) at least one pair of the plurality of pairs of adjacent concave-shaped stiffening ribs is disposed on one end of the bushing member, and (ii) at least one pair of the plurality of pairs of adjacent concave-shaped stiffening ribs is disposed on an opposite end of the bushing member.

10. A bushing assembly according to claim 9, wherein (i) the at least one pair of the plurality of pairs of adjacent concave-shaped stiffening ribs that is disposed on the one end of the bushing member includes at least four pairs of adjacent concave-shaped stiffening ribs, and (ii) the at least one pair of the plurality of pairs of adjacent concave-shaped stiffening ribs that is disposed on the opposite end of the bushing member includes at least four pairs of adjacent concave-shaped stiffening ribs.

11. A bushing assembly according to claim 8, wherein the bushing member includes (i) an inner circumferential surface having at least one groove for receiving an O-ring, and (ii) an outer circumferential surface having at least one groove for receiving an O-ring.

12. A bushing assembly according to claim 11, further comprising:
a first O-ring inserted into a first groove in the inner circumferential surface of the bushing member;
a second O-ring inserted into a second groove in the inner circumferential surface of the bushing member; and
a third O-ring inserted into a third groove in the outer circumferential surface of the bushing member.

13. A bushing assembly according to claim 8, wherein the bushing member includes an outer circumferential edge into which a surface of an adapter base of the spring brake actuator is staked or wedged against.

14. A bushing assembly for a spring brake actuator of a vehicle air braking system, the bushing assembly comprising:

a non-metallic bushing member including a first plurality of stiffening ribs disposed on one end of the bushing member, and a second plurality of stiffening ribs disposed on an opposite end of the bushing member, wherein (i) the stiffening ribs of the first plurality of stiffening ribs are circumferentially spaced apart from each other on the one end of the bushing member, (ii) the stiffening ribs of the second plurality of stiffening ribs are circumferentially spaced apart from each other on the opposite end of the bushing member, (iii) each pair of adjacent ribs of the first plurality of stiffening ribs has a circumferential distance therebetween that is substantially the same, (iv) each pair of adjacent ribs of the second plurality of stiffening ribs has a circumferential distance therebetween that is substantially the same, (v) the first plurality of stiffening ribs and the second plurality of stiffening ribs are circumferentially offset from each other about a longitudinal central axis of the bushing member, (vi) each rib of the first and second plurality of stiffening ribs has a concave shape that curves inward toward center of the bushing member, (vii) the bushing member includes an inner circumferential surface having at least one groove for receiving an O-ring, and (viii) the bushing member includes an outer circumferential surface having at least one groove for receiving an O-ring.

15. A subassembly comprising the bushing assembly of claim 14, an adapter base having an adapter plate, a diaphragm in contact with the adapter plate, and an adapter push rod secured to the adapter plate, wherein the non-metallic bushing member is disposed between the adapter base and the adapter push rod.

16. A subassembly according to claim 15, wherein a surface of the adapter base is staked into or wedged against an outer circumferential edge of the non-metallic bushing member.

\* \* \* \* \*